(12) United States Patent
Shin

(10) Patent No.: US 12,450,293 B2
(45) Date of Patent: Oct. 21, 2025

(54) ASSISTED SEARCHING OF NON-DOCUMENT ITEMS

(71) Applicant: Google LLC, Mountain View, CA (US)

(72) Inventor: Dongeek Shin, Santa Clara, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/057,427

(22) Filed: Nov. 21, 2022

(65) Prior Publication Data

US 2023/0214427 A1 Jul. 6, 2023

Related U.S. Application Data

(60) Provisional application No. 63/266,205, filed on Dec. 30, 2021.

(51) Int. Cl.
*G06F 16/00* (2019.01)
*G06F 16/9038* (2019.01)
*G06F 16/906* (2019.01)
*G06F 16/908* (2019.01)

(52) U.S. Cl.
CPC ........ *G06F 16/9038* (2019.01); *G06F 16/906* (2019.01); *G06F 16/908* (2019.01)

(58) Field of Classification Search
CPC .................................................. G06F 16/9038
USPC ......................................................... 707/728
See application file for complete search history.

(56) References Cited

U.S. PATENT DOCUMENTS

2011/0022609 A1   1/2011 Grover
2011/0131235 A1   6/2011 Petrou et al.
2013/0198162 A1   8/2013 Refer
2013/0282642 A1  10/2013 Claux et al.
(Continued)

FOREIGN PATENT DOCUMENTS

AU      2014200923 A1   3/2014
CN       107622074 A    1/2018
(Continued)

OTHER PUBLICATIONS

Kurdi, "Drag & Drop Search: an Innovative extension that will transform the way you search in Chrome", retreived from https://www.freewaregenius.com/drag-drop-search-an-innovative-extension-that-will-transform-the-way-you-search-in-chrome/, Aug. 24, 2012, 2 pages.
(Continued)

*Primary Examiner* — Alexandria Y Bromell
(74) *Attorney, Agent, or Firm* — Brake Hughes Bellermann LLP

(57) ABSTRACT

Disclosed implementations provide a streamlined, assisted search process for surfacing items from a database that enables guided exploratory searching. For example, a system may receive selected content from a client device and determine a first object and a second object for the selected content using a search converter. The system may generate first results by performing a first search of items in a database using the first object as a query, and generate second results by performing a second search of the items in the database using the second object as a query. The system may select a first set of the first results based on relevance of the first object to the selected content and a second set of the second results based on relevance of the second object to the selected content. The system may provide a combined search result including the first set and the second set.

20 Claims, 12 Drawing Sheets

(56) References Cited

U.S. PATENT DOCUMENTS

2015/0046860 A1* 2/2015 Sutou ............... G06F 3/0486
715/769
2019/0392009 A1* 12/2019 Kang ............... G06F 16/634
707/707

FOREIGN PATENT DOCUMENTS

| JP | 2013501975 A | 1/2013 |
| JP | 2013205943 A | 10/2013 |
| JP | 2020534597 A | 11/2020 |

OTHER PUBLICATIONS

International Search Report and Written Opinion for PCT Application No. PCT/US2022/080332, mailed on Feb. 28, 2023, 11 pages.
Office Action for Japanese Application No. 2024-539601 (with English translation), mailed Aug. 5, 2025, 15 pages.

* cited by examiner

ASSISTED SEARCHING OF NON-DOCUMENT ITEMS

CROSS-REFERENCE TO RELATED APPLICATION

This application is a non-provisional of, and claims priority to, U.S. Application No. 63/266,205, filed on Dec. 30, 2021, titled "Assisted Searching of Non-Document Items," the disclosure of which is incorporated by reference herein in its entirety.

BACKGROUND

Currently, searching for non-document items in a database, such as browser extensions, mobile applications, web applications, catalog/inventory items, etc., requires the user to (1) determine and provide relevant keywords, (2) scroll through search results and identify whether the item the user hopes to find is listed, and (3) if not, repeat steps (1) and (2) until a solution is reached or the user gives up.

SUMMARY

Disclosed implementations provide a streamlined, assisted search process for surfacing items from a database that enables guided exploratory searching. The disclosed system includes an interface that enables a user to trigger a search from selected content. For example, the interface may enable a user to select, drag, and drop content onto a control (e.g., actionable icon/button), which interprets the drop as a query request, e.g., to search a data store of discrete items based on the selected content. As another example, the user may select the content and then activate the control (e.g., click, select), which triggers a smart search of the selected content. The selected content can be text, a link, and/or an image. Disclosed systems may intelligently select keywords for the search based on analysis of the content to identify objects suggested by the content. The objects represent keywords, topics, entities, etc., that can serve as queries for a database of items. Disclosed systems can initiate searches of the data store using one, two, or more of the identified objects as queries. The content analysis may include converting objects identified in or suggested by the content into keywords relevant for (customized to) the database. Searches for two or more objects (two or more queries) may be performed in parallel. The searches may return top-ranking items for each query. A novel parallel search result interface presents top-ranking items from the searches grouped by query, based on saliency and confidence of the detected objects and their corresponding results.

DETAILED DESCRIPTION

Figure 1:
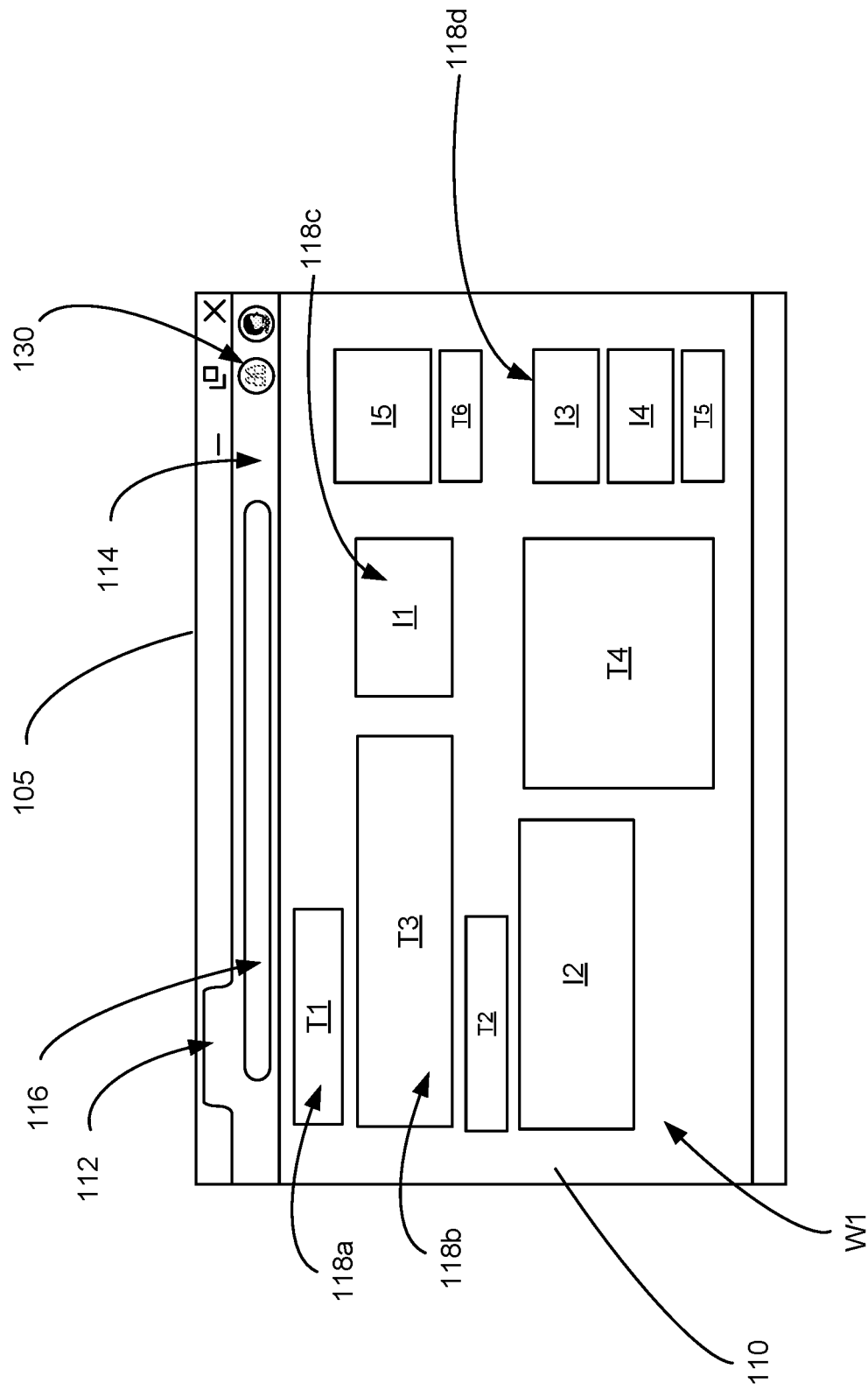
FIG. 1 is a diagram that illustrates content displayed in a webpage and a selected content search control, according to some implementations.

The disclosure is related to searching a database of items initiated not by keywords entered by the user, but through analysis of content of a webpage selected by the user. Specifically, an area of the webpage can be selected (e.g., selected using a gesture and/or an input device) and the selected region can be searched in response to the selection of the region. The selected region can be analyzed for objects. In some implementations, additional context may be provided with the selected content, which can aid in the identification of the objects. In some implementations, at least two objects may be submitted as queries for searching the database of items. The object(s) submitted as queries may be optimized/customized for the database of items to increase the likelihood of finding responsive items.

Disclosed implementations may also include generating a combined search result page. A search result page includes a plurality of search results and is presented in a user interface of a browser. Each search result corresponds to an item identified as responsive to the query. A search result may identify the item. A search result may include additional information related to (e.g., an attribute of) the item. Thus, the combined search result page may include a set of items (a set of search results) responsive to a first query (e.g., for the first object) and a set of items (a set of search results) responsive to a second query (e.g., for the second object). Items in the sets of items may be ranked independently of each other. The number of items in the first set of items may be a function of the number of items returned, a confidence score associated with the first object, a saliency score for the first object, and the relevance of the items to the first object. The number of items in the second set of results may be similarly determined. In some implementations the number of items in the second set may also be a function of the number of items in the first set in addition to the other factors. In some implementations, the items in the first set may be provided with additional information (e.g., as rich result). In some implementations, the items in the first set may be presented ahead of the items in the second set. In some implementations, the combined search result page can replace content of the webpage within the browser. In some implementations, the combined search result page can be displayed within another tab in the browser. In some implementations, the combined search result page can be presented in another window of the browser tab.

A technical problem associated with searching for non-document items in a database (e.g., discrete items) is that such items may lack meaningful text to index. Unlike documents, which provide ample text for indexing, non-document items, such as browser extensions, mobile applications, web applications, catalog/inventory items, and the like, may have a title, a brief description of the item, and/or a manifest file from which to pull and index terms/phrases. But these attributes may not include text that lines up with how users search. Thus, there can be a disconnect between how the user searches and how the items are indexed and searchable.

At least one technical solution to this technical problem of searching a database of items associated with minimal searchable text is the inclusion of a search converter. The search converter may be disposed between the client computer (e.g., operated by the user) and a search engine for the database of items to assist the user in searching the database of discrete items. The search converter can be configured to analyze the selected content (e.g., images, text, hyperlinks, etc., selected by the user), to identify objects within the content and generate queries based on the identified objects. In generating the queries, the search converter can be configured to ensure that the objects identified are relevant to the items in the database. For example, example, the search converter for a repository (database) of mobile applications may be configured to predict an object of selfie as a query for the repository from an image showing a head-shot of a person, rather than predicting man, woman, person, or some other object. Likewise, a search converter for a database of books may predict an author's name as a query after analyzing the same image and/or may give a higher saliency score to an author recognized in an image as opposed to other people recognized in the image. The search converter may be configured to initiate searches in the database corresponding to at least two objects identified in the selected content. These searches can be initiated in parallel, meaning that both queries (or several queries) can be submitted concurrently, which reduces the delay between receiving the query and presentation of a result page for the query.

Another technical problem associated with non-keyword based searches is minimizing the number of separate search requests issued to enable the user to arrive at a satisfactory answer. As outlined above, several separate searches, using different keywords as query terms, may be needed for the user to arrive at a satisfactory answer. A satisfactory answer represents a search result page that includes at least a search result that answers an intended question. Because user intent cannot be objectively determined, some conventional search systems may search for a most likely intent (object) and provide additional links indicating other objects (e.g., a link relating to did you mean the fruit apple), which may initiate a different search when selected. Where different objects may relate to an inferred intent, some conventional search systems may include top results for different objects, e.g., intermixing search results for Apple the company with a top result or two for apple the fruit. Both methods can increase the number of independent search requests.

A technical solution to this technical problem includes submitting parallel queries for different inferred intents and a novel interface that may display the top-responsive items to each parallel query together in the interface. For example, if the search converter determines that the objects video conference, browser, and video recording are recognized in a selected image and/or text, the search converter may send all three objects as parallel queries to the search engine, which will return the top results for each object. The system may select and order these search results based on the confidence and saliency scores assigned to the objects, so that some responsive items for the most salient query are returned and displayed together, followed by some responsive items from the second most salient query, etc. In some solutions, the responsive items for the most salient query may be presented before the responsive items for the next query. In some solutions, the responsive items for the most salient query may include additional information about the individual responsive items that is not included in the results for the items responsive to the other queries. In some solutions, the number of items displayed for each query (e.g., in the set of responsive items selected for display) may depend on the confidence and saliency scores of the objects submitted as queries and the relevance of the items to the query itself.

Technical effects of the features described herein include streamlining a search and encouraging discovery and exploration of items where minimal searchable text is available for search indexing. Specifically, the disclosed techniques may use machine learning or other techniques to generate smart queries based on predicted intents, which potentially eliminates the search-retry-search-retry manual process. Moreover, the search may be faster because multiple queries (multiple inferred intents) are searched in parallel. In addition, because the smart queries can be tuned/customized to the database being searched, the smart queries are more likely to return salient items, further reducing iterations of search requests. The parallel query submission and novel result interface, integrating the results from different queries, encourages exploration and discovery, enabling users to discover results the user might not have thought to look for.

FIG. 1 is a diagram that illustrates content displayed in a webpage W1 on a client device. The webpage W1 is displayed (e.g., rendered) within a display area 110 within a tab 112 of a browser 105. The browser 105 includes an address bar area 114. The address bar area 114 can be controlled by and/or associated with the browser 105 (e.g., the browser application). The address bar area 114 can be controlled by the browser 105 instead of the webpage W1 and/or a provider of the webpage W1. An address of the webpage W1 can be illustrated in the address bar area 114 (e.g., input address area 116). Other controls, icons, and/or so forth can be included in the address bar area 114. For example, the address bar area 114 may include a search control 130. The search control 130 may be an icon, button, or image configured to initiate a search of selected content when activated by a user. In some implementations, the search control 130 may be configured as a "drop" location. A drop location represents an area of the display that can receive a drop action. A drop action is the last action in a drag-and-drop sequence. The drop action conventionally corresponds to the release of a mouse button, the lifting of a finger or stylus, a paste (e.g., control-v) keyboard command, and the like. When the search control 130 is configured as a drop location, the search control 130 is activated and receives the drop action. In some implementations, the search control 130 may be configured as a button activated by user selection of the search control 130. Activating the selection control can take a number of forms, depending on the configuration of the client device. For example, a user may click the search control 130 with a pointer, tap the search control 130 with a finger, two fingers, etc., tap the search control with a stylus, look at the search control and blink, etc.

The webpage W1 includes several items of content 118, such as images I1, I2, I3, I4, I5, text headings T1 and T2, and text blocks T3, T4, T5, and T6. The text blocks may represent a sentence, a paragraph, multiple paragraphs, a list or lists, a table or tables, or the like. The text blocks can include links. A link has anchor text, or text displayed to the user, and an address of a document, which is not necessarily displayed. When a link is included in a user selection, the selected content may include the anchor text for the link as well as content from the link address, i.e., the document pointed to/identified by the link address. A user may select an item of content, such as text heading T1 (118a) or image I1 (118c). A user may select multiple items of content, such as image I3 and text blocks T4 and T5. A user may select a portion of a content item, such as a portion of text block T3 (118*b*). A user may select one content item and a portion of another content item.

Figure 2A:
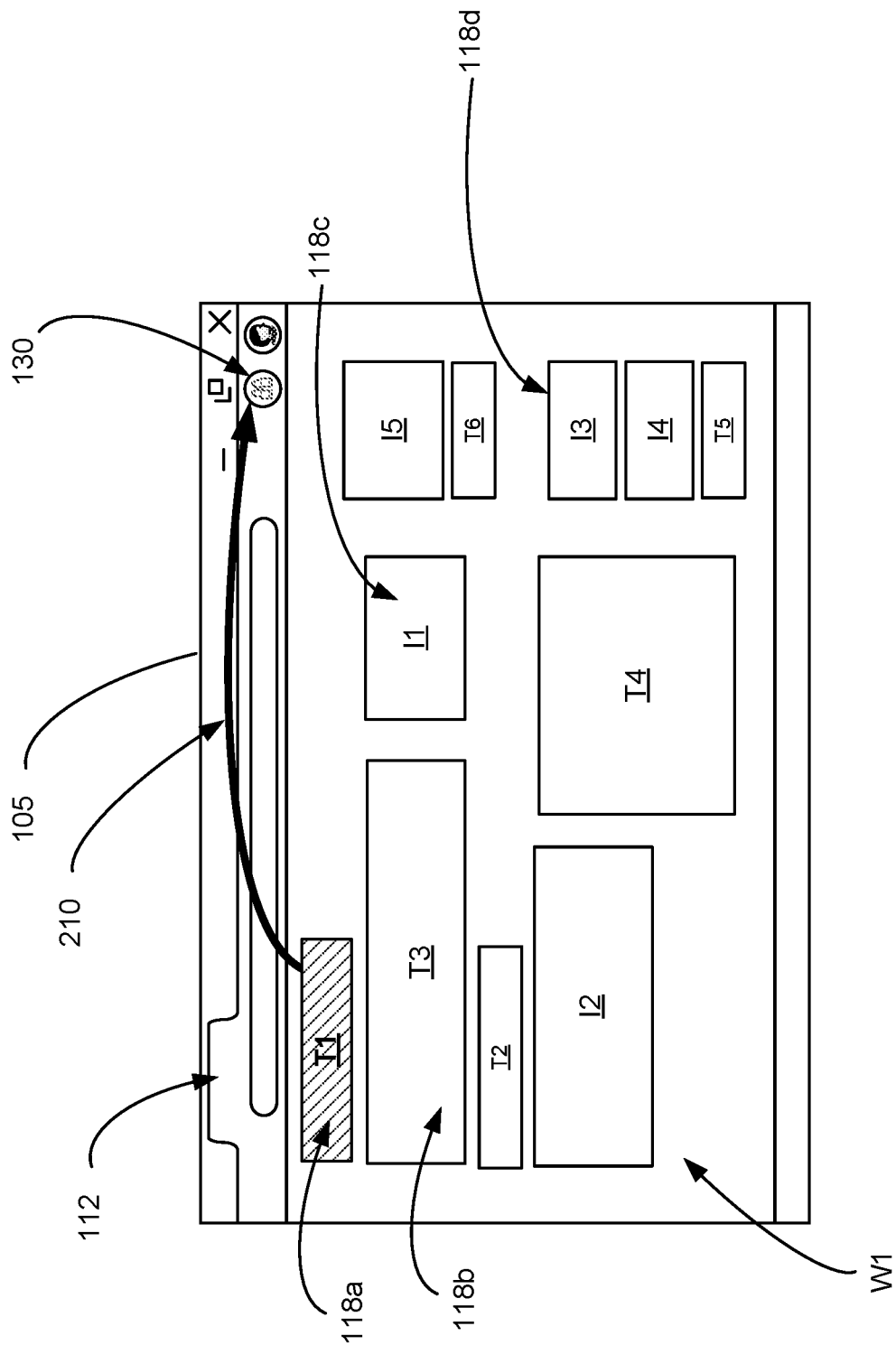
FIGS. 2A-2D illustrate various content selections that trigger an assisted search of the selected content of the webpage of FIG. 1, according to various implementations.

FIGS. 2A-2D illustrate various content selections that trigger an inferred intent search of a database of items selected content of the webpage of FIG. 1, according to various implementations. FIG. 2A illustrates the selection of content item 118*a* (representing text heading T1), with the selection indicated with diagonal lines. With the selection of content item 118*a*, the user may activate the search control 130, which triggers an inferred intent search of the database of items. To activate the search control 130, the user may select-and-drag the content item 118*a* to the control 130, dropping the content item 118*a* on the control 130. This is represented by the arrow 210 in FIG. 2A. Alternatively (or additionally), the user may select the content item 118*a* and then select the search control 130 to trigger the inferred intent search of the database. Regardless of how the search control 130 is activated, the selected content, e.g., the text of the heading T1, is provided to a search system. In some implementations, additional content items may also be provided as context for the search. For example, content item T3, or a portion of content item T3 (e.g., a first sentence, a predetermined number of words proximate the selected content item 118*a*), may be provided as context. In another example, all content items T2-T7 and I1-I5 may be provided. In another example, content items proximate the selected content 118*a* may be provided, e.g., text box T2 and image I1, or some other combination of less than all content items.

Figure 2B:
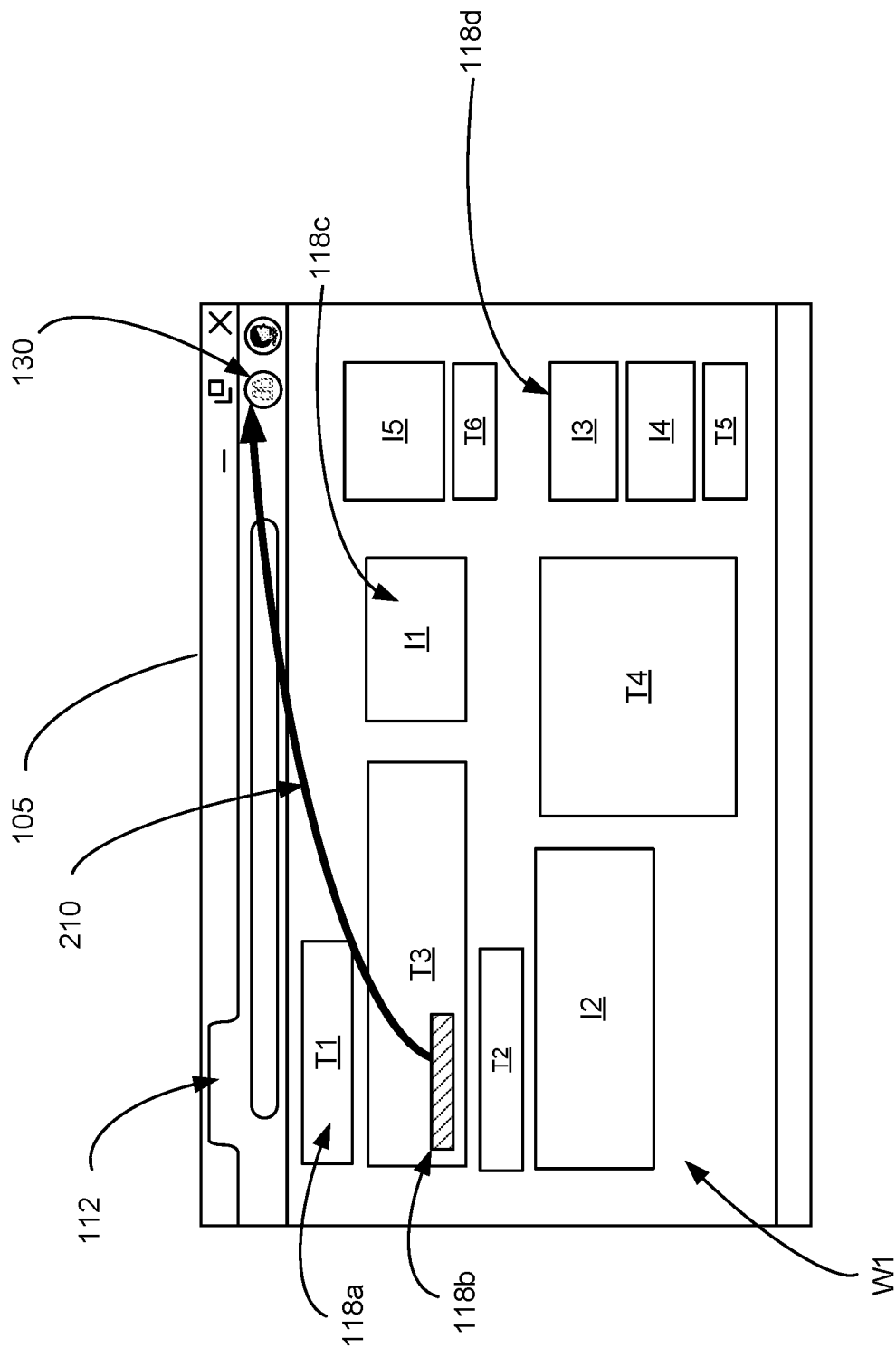

FIG. 2B illustrates the selection of a portion of content item 118*b* (representing text block T2), with the selection indicated with diagonal lines. The portion of content item 118*b* may be a word, multiple words, a sentence, multiple sentences, a list item, a table cell, a table row, a table column, a link, and the like, or any combination of these. As described above with respect to FIG. 2A, after the user selects the portion of content item 118*b*, the user may activate the search control 130, which triggers an inferred intent search of the database of items using the selected portion of the content item 118*b*. This may include dragging and dropping the selected portion of content item 118*b* on the search control 130, represented by arrow 210 or user selection of the search control 130 when the portion of content item 118*b* is selected. As described with respect to FIG. 2A, another content item, a portion of a content item, multiple content items, or portions of multiple content items may be provided as context for the search.

Figure 2C:
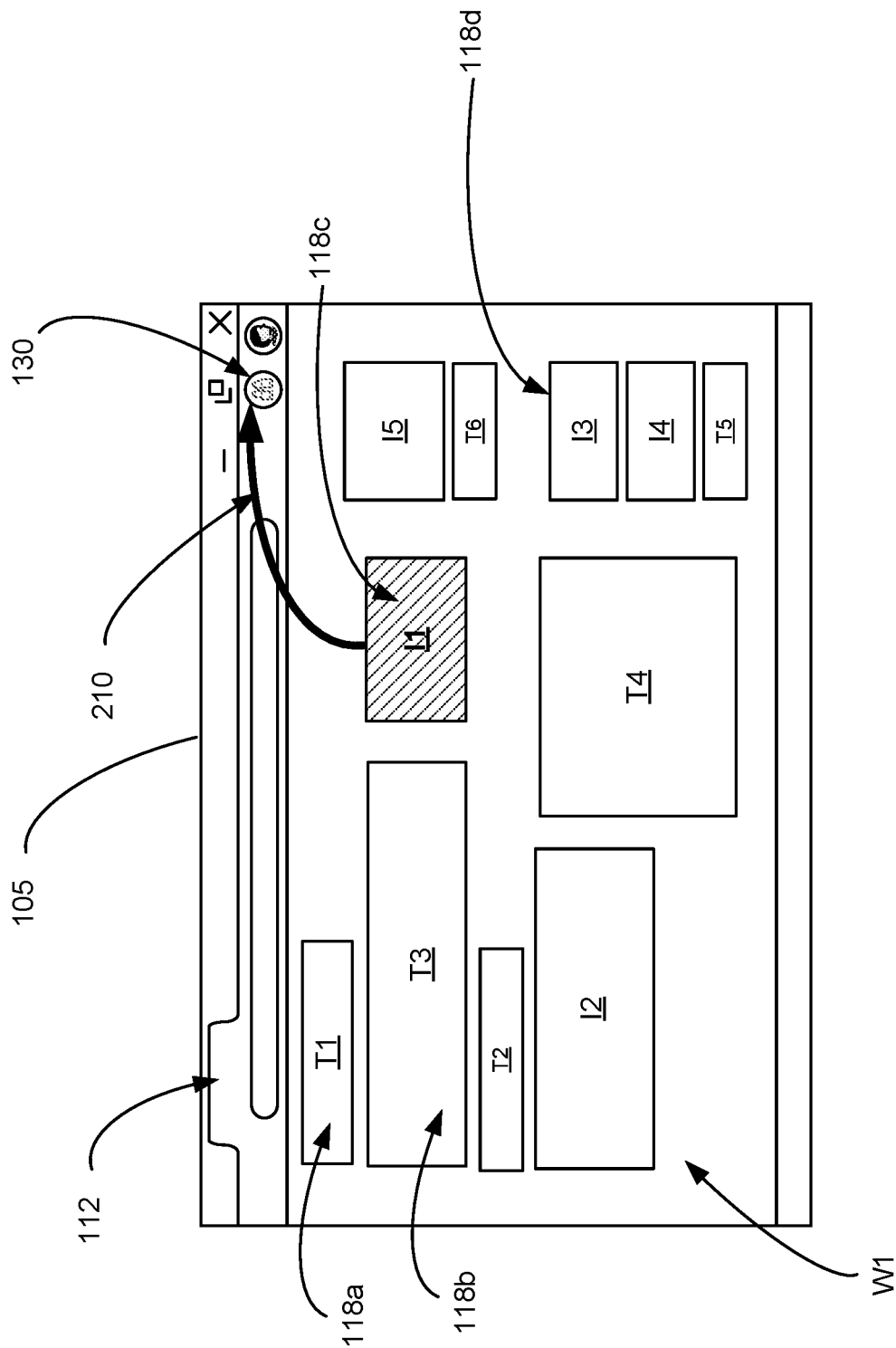

FIG. 2C illustrates the selection of an image content item 118*c* (representing image I1), with the selection indicated with diagonal lines. The image content item 118*c* may be any kind of image and may include text as well as icons or other images. As described above with respect to FIGS. 2A and 2B, after the user selects the image content item 118*c*, the user may activate the search control 130, which triggers an inferred intent search of the database of items using the selected content item 118*c*. This may include dragging and dropping the selected image content item 118*c* on the search control 130, represented by arrow 210, or user selection of the search control 130 while the image content item 118*c* is selected. As described with respect to FIGS. 2A and 2B, another content item, a portion of a content item, multiple content items, or portions of multiple content items may be provided as context for the search.

Figure 2D:
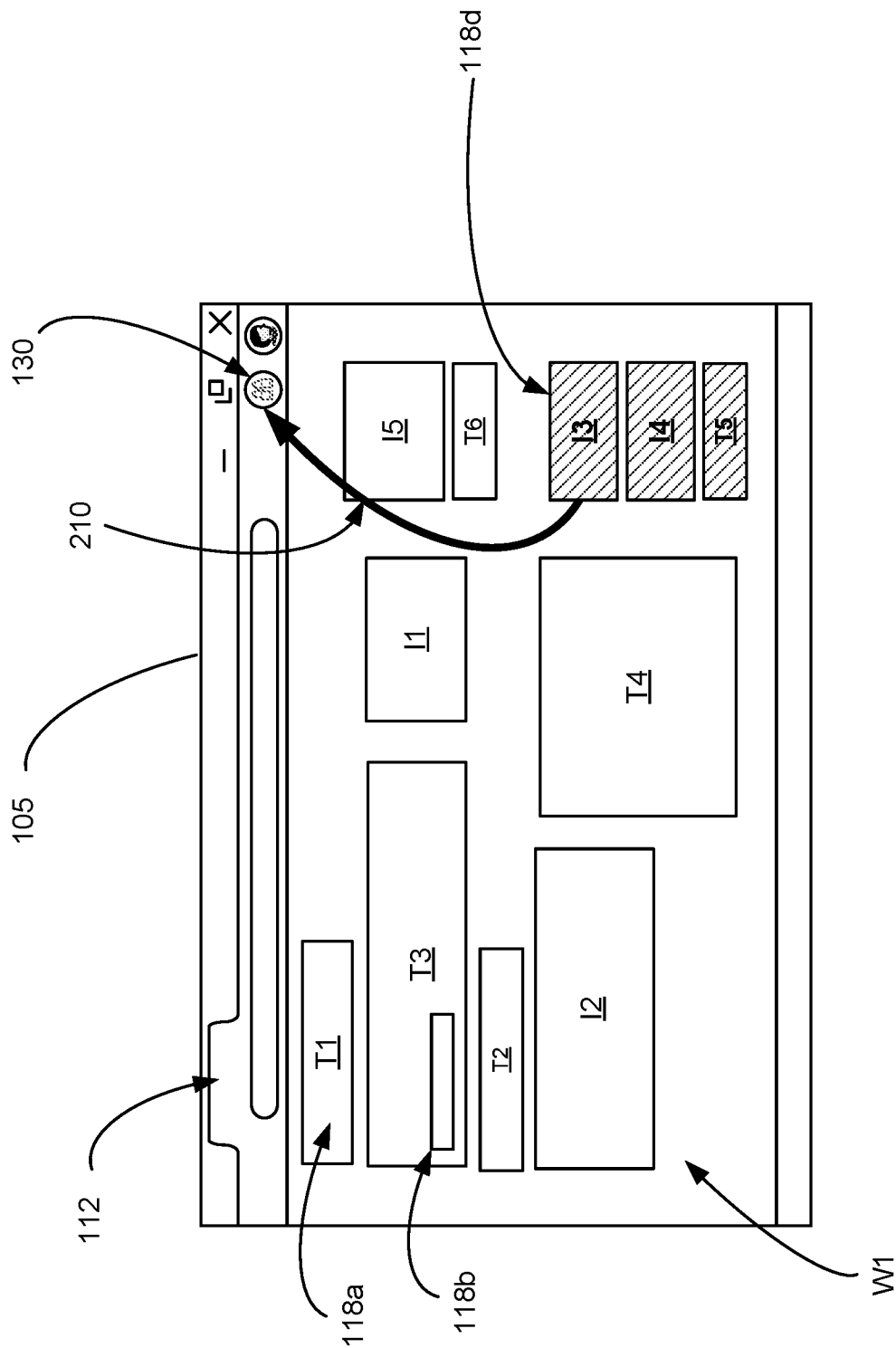

FIG. 2D illustrates the selection of multiple content items 118*d* (representing image I3, image I4, and text box T5), with the selection indicated with diagonal lines. The multiple content items 118*d* includes both text and image content. As described above with respect to FIGS. 2A-2C, after the user selects the content items 118*d*, the user may activate the search control 130, which triggers an inferred intent search of the database of items using the multiple content item 118*d*. This may include dragging and dropping the selected content items 118*d* on the search control 130, represented by arrow 210, or user selection of the search control 130 while the content items 118*d* are selected. As described with respect to FIGS. 2A-2C, another content item, a portion of another content item, multiple content items, or portions of multiple content items may be provided as context for the search.

Figure 3A:
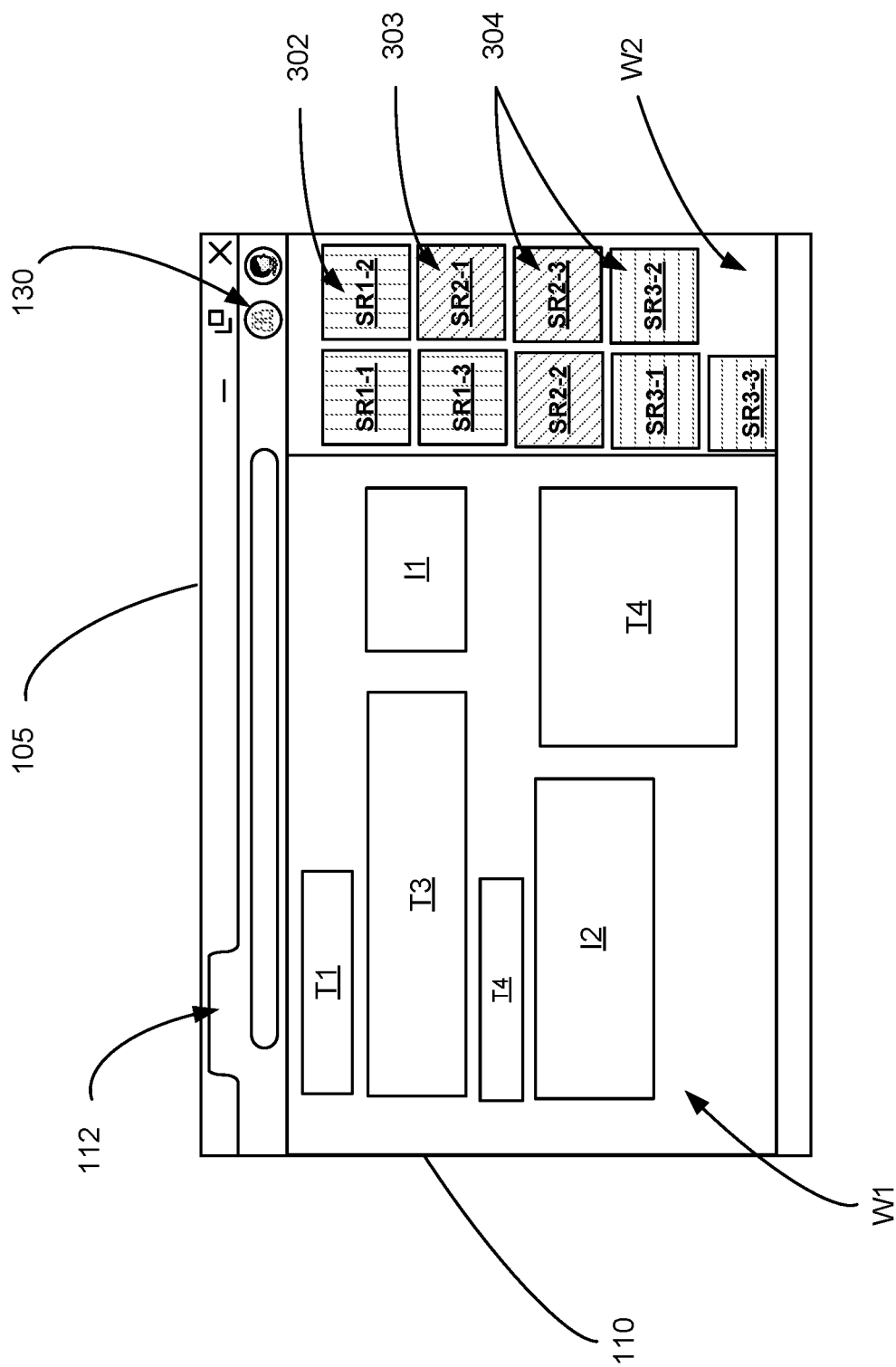
FIGS. 3A-3C illustrate various assisted search result interfaces, according to various implementations.
Figure 3B:
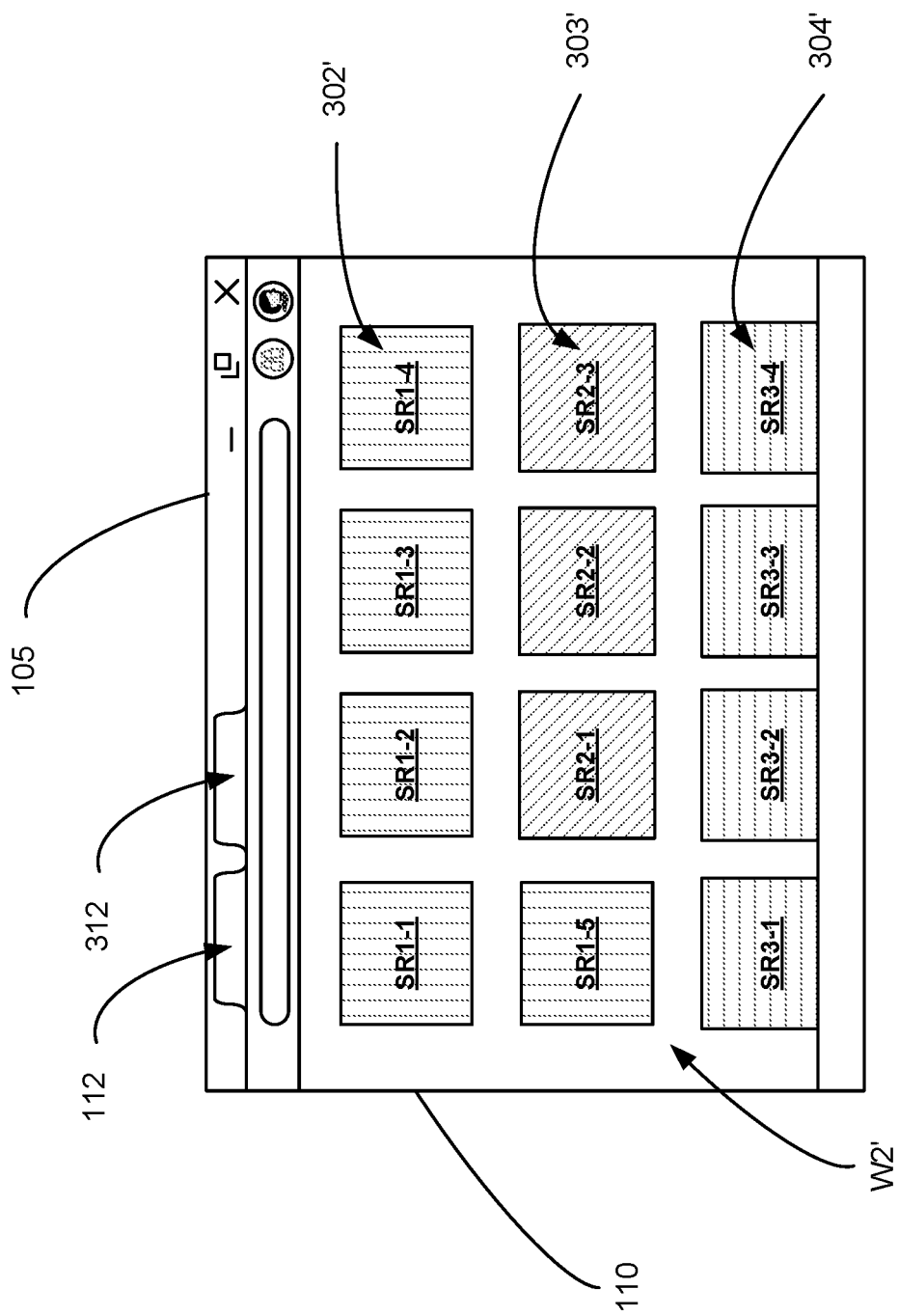
Figure 3C:
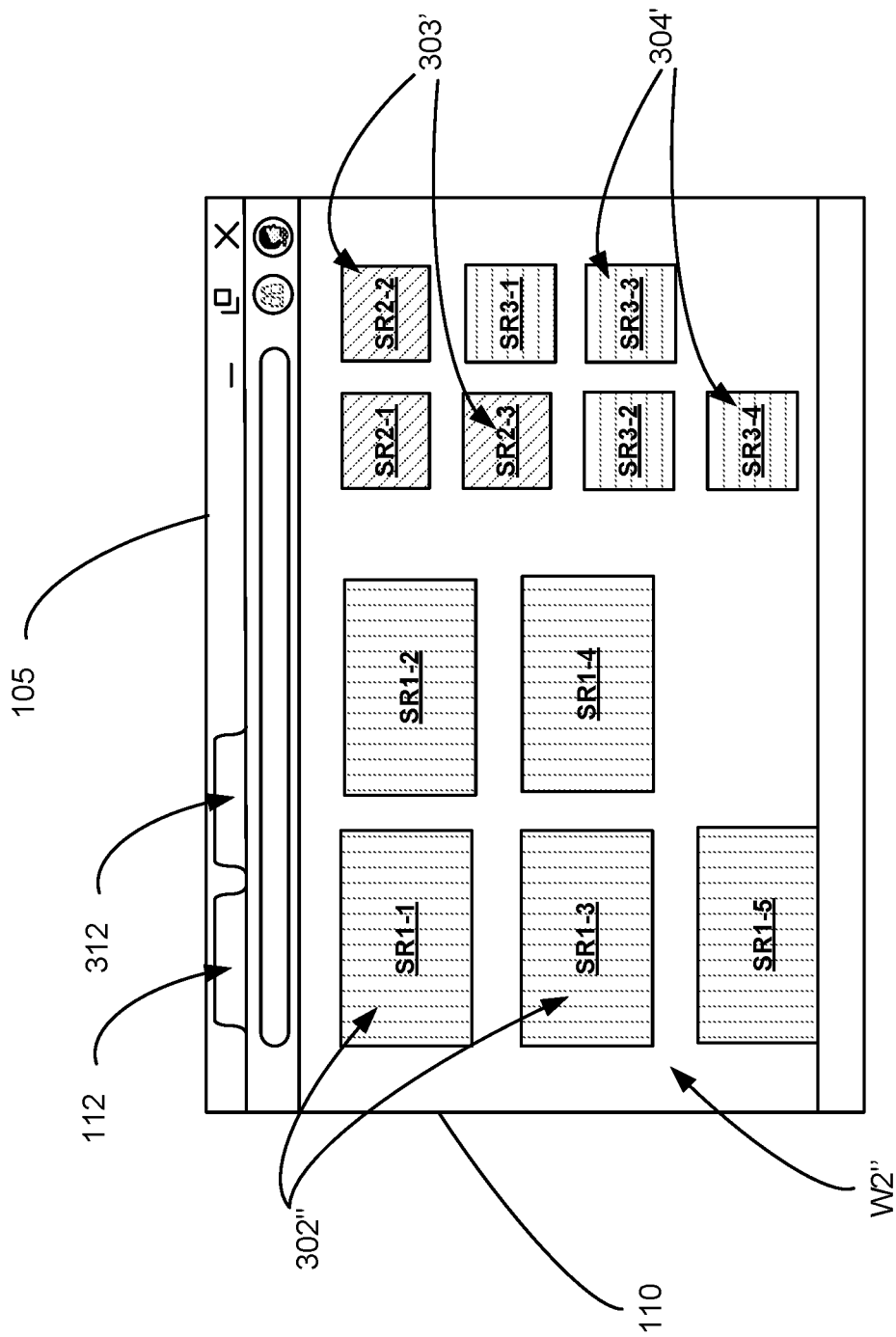

FIGS. 3A-3C illustrate various inferred intent search result interfaces, according to various implementations. The search result interfaces are generated in response to the inferred intent search query being completed. The combined search result page is represented by a search result page W2. In the example of FIG. 3A, the search result page W2 is displayed as a sidebar, or split screen with the webpage W1. Thus, both portions of the webpage W1 and the search result page W2 are displayed in the display area 110 of the browser tab 112. A search result page generated for an inferred intent search may include a set of responsive items for two or more queries. In the example of FIGS. 3A-3C, the search result page W2 includes three sets of responsive items. In the example of FIG. 3A, the first set of responsive items 302 is indicated by vertical fill lines and includes search results SR1-1, SR1-2, and SR1-3. Each of search result SR1-1, SR1-2, and SR1-3 represent a respective item in the database. The search result may include the name of the item. The search result may include an image or icon for the item. The search result may include a brief description of the item. The search result may include a link to a more detailed description of the item, a page for purchasing or downloading the item, etc. The first set of responsive items 302 are items responsive to a first query executed against the database of items.

The example of FIG. 3A includes a second set of responsive items 303, indicated by diagonal fill lines. The second set of responsive items 303 includes SR2-1, SR2-2 and SR2-3 (also referred to as search results). The items represented by the second set of responsive items 303 are items responsive to a second query executed against the database of items. The search results SR2-1, SR2-2, and SR2-3 may include information about their respective items similar to that included in search results SR1-1, SR1-2, and SR1-3. The example of FIG. 3A includes a third set of responsive items 304, indicated by horizontal fill lines. The third set of responsive items 304 includes SR3-1, SR3-2, and SR3-3. The items represented by the third set of responsive items 304 are items responsive to a third query executed against the database of items. The third query, second query, and the first query may have been submitted in parallel, enabling the search system to provide the search result page W2 faster, thus decreasing the response time after the query is submitted. The search results SR3-1, SR3-2, and SR3-3 may include information about their respective items similar to that included in search results SR1-1, SR1-2, and SR1-3. The number of items of each set of search results can be a function of several factors, including the size of the display area of the search result page W2, the confidence and saliency of the inferred object used as the query, the number of responsive items for a query, the relevance of those items to the query, and the number of items already selected in other sets for other queries, as will be explained in more detail with regard to FIG. 6. The relatively smaller proportion (space on) of the display area 110 occupied by W2 may result in fewer items in each set of items 302, 303, 304. Besides a split window, the search result page W2 may have a smaller display area if the client device is a smart phone or wearable.

In the example of FIG. 3B, the search result page W2' is displayed in a new tab 312 of the browser 105. This new tab 312 is the active tab and, thus, the webpage W2' fills the display area 110 of the browser 105. The content of webpage W1, associated with tab 112, is no longer visible but may become visible again in response to the user selecting tab 112. In the example interface of FIG. 3B, the search result page W2' displays three sets of responsive items 302', 303', and 304'. As with FIG. 3A, the three sets of search results (responsive items) represent the three different queries executed against the database of items. Because the portion of (space on) the display area 110 occupied by webpage W2' is larger than the portion of the display area 110 occupied by webpage W2 of FIG. 2A, the number of items in each set of items may be larger. Thus, for example the set of responsive items 302' may include five items, the set of responsive items 303' may include three items, and the set of responsive items 304' may include four items. The information included in each search result may be similar to the information included in the search results discussed above with regard to FIG. 3A. In both FIG. 3A and FIG. 3B the items responsive to the first query (e.g., a set of responsive items 302 and 302') have prominence over the items responsive to the second query (e.g., the set of responsive items 303 and 303'). The prominence may be manifested by the first results being presented ahead of/before the second results. The prominence may be manifested in other ways (e.g., by occupying more of the display area (being bigger than, occupying more space on the display) and/or including more information).

FIG. 3C illustrates an implementation where the items responsive to the first query are not presented ahead of items responsive to the second query, but instead include additional information or occupy a larger proportion of the search result page W2". In the example of FIG. 3C, the set of responsive items 302" represent items responsive to the first query. These search results may be presented larger than, or occupying a larger percentage of the display area 110 than, the sets of responsive items 303' and 304'. This is an example of the prominence of the set of responsive items 302" over the sets of responsive items 303' and 304'. The set of responsive items 302" may include information similar to the set of responsive items 302' but in larger font, a higher zoom level, etc. The set of responsive items 302" may include additional information not included in the set of responsive items 302'. For example, search result SR1-1 of responsive items 302" may include ratings, selling price, publisher information, or other attributes of the item that were not included in SR1-1 of responsive items 302 or 302'. Because of the inclusion of the additional information, the set of responsive items 302" may be referred to as rich results. The rich results may include any additional information about an item that is not included in the other search result sets, e.g., sets of responsive items 303' and 304'. The sets of responsive items 303' and 304' may also be displayed, but in another area/portion of the display. In some implementations, the sets of responsive items 303' and 304' may be presented after the rich results, e.g., the set of responsive items 302".

Figure 4:
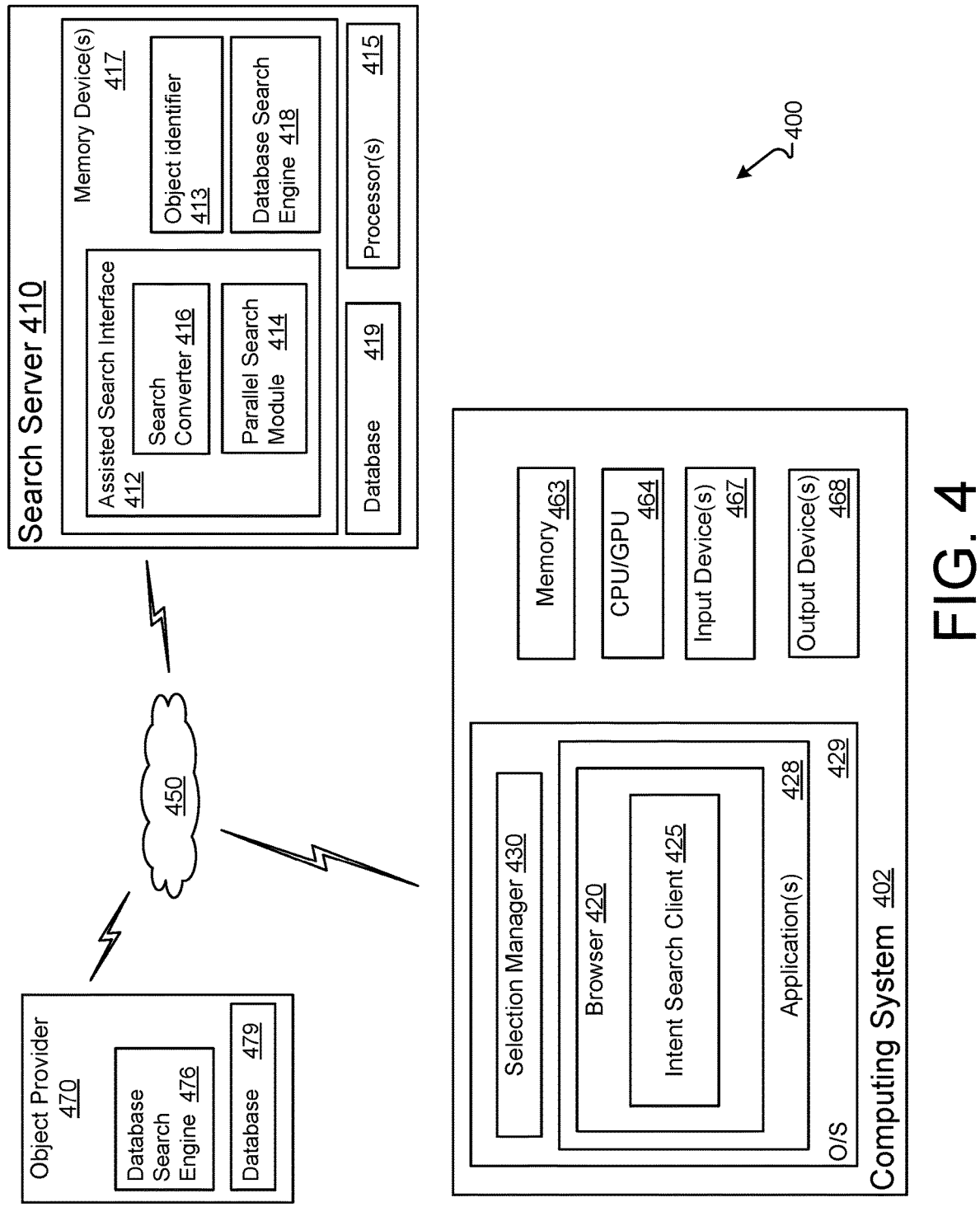
FIG. 4 illustrates a computing system and search server for implementing the concepts described herein.

FIG. 4 illustrates a system 400 including a computing system 402 and search server 410 for implementing the concepts described herein. The computing system 402 may also be referred to as a client computing device or a client device. The computing system 402 is a device having an operating system 429. In some examples, the computing system 402 includes a personal computer, a mobile phone, a tablet, a netbook, a laptop, a smart appliance (e.g., a smart television), or a wearable. The computing system 402 can be any computing device with a display that enables a user to select displayed content. The computing system 402 may include one or more processors 464 formed in a substrate configured to execute one or more machine executable instructions or pieces of software, firmware, or a combination thereof. The processors 464 can be semiconductor-based—that is, the processors can include semiconductor material that can perform digital logic. The computing system 402 may include one or more memory devices 463. The memory devices 463 may include a main memory that stores information in a format that can be read and/or executed by the processors 464. The memory devices 463 may store applications or modules (e.g., operating system 429, applications 428, selection manager 430, browser 420, etc.) that, when executed by the processors 464, perform certain operations.

The operating system 429 is a system software that manages computer hardware, software resources, and provides common services for computing programs. In some examples, the operating system 429 is operable to run on a personal computer such as a laptop, netbook, or a desktop computer. In some examples, the operating system 429 is operable to run a mobile computer such as a smartphone or tablet. The operating system 429 may include a plurality of modules configured to provide the common services and manage the resources of the computing system 402. The computing system 402 may include one or more input devices 467 that enable a user to select content. Non-exclusive example input devices 467 include a keyboard, a mouse, a touch-sensitive display, a trackpad, a trackball, and the like. The computing system 402 may include one or more output devices 468 that enable a user to view a webpage and/or receive audio or other visual output.

The computing system 402 may include applications 428, which represents specially programmed software configured to perform different functions. One of the applications may be the browser 420. The browser 420 may be configured to display webpages, execute web applications, and the like. The browser 420 may include additional functionality in the form of extensions. The operating system may also include a selection manager 430 configured to enable the user to select, copy, paste, drag, and drop content. The browser 420 is an example of the browser 105 of FIG. 1 and may include a control, such as control 130 configured to trigger a contextual search of database 419 and/or database 479. The browser 420 may include an intent search client 425 configured to trigger the search. Thus, the intent search client 425 may represent software executed in response to the activation of the search control. The intent search client 425 may send the selected content to a search server 410. The intent search client 425 may capture and use context surrounding the selected content and provide this context to the search server 410. For example, if a sentence is the selected content, the paragraph in which the sentence appears may also be sent to the search server 410 with the selected content (or potentially the entire page).

In some examples, the computing system 402 may communicate with the search server 410 over a network 450. The search server 410 may be a computing device or computing devices that take the form of a number of different devices, for example a standard server, a group of such servers, or a rack server system. In some examples, the search server 410 may be a single system sharing components such as processors and memories. The network 450 may include the Internet and/or other types of data networks, such as a local area network (LAN), a wide area network (WAN), a cellular network, satellite network, or other types of data networks. The network 450 may also include any number of computing devices (e.g., computer, servers, routers, network switches, etc.) that are configured to receive and/or transmit data within network 450. Network 450 may further include any number of hardwired and/or wireless connections.

The search server 410 may include one or more processors 415 formed in a substrate, an operating system (not shown) and one or more memory devices 417. The memory devices 417 may represent any kind of (or multiple kinds of) memory (e.g., RAM, flash, cache, disk, tape, etc.). In some examples (not shown), the memory devices 417 may include external storage, e.g., memory physically remote from but accessible by the search server 410. The search server 410 may include one or more modules or engines representing specially programmed software. For example, the search server 410 may include a database search engine 418 configured to search a database 419 of items. The search engine 418 includes an index of terms that is used to determine which items in the database 419 are responsive to a query. The database 419 of items include non-document items. In other words, the items in the database 419 are not documents available over the internet, but instead a more limited, discrete, repository of items. Examples of items in the database 419 include installable items, such as browser extensions, mobile applications, native applications, and progressive web applications. Other examples of items in the database 419 include items for purchase (e.g., via an online store, classified ads, or a catalog), items in a library, items for streaming (e.g., video, audio, media files), items for rent, and the like. The database 419 may be searchable by a limited number of text fields. For example, the items in database 419 may be indexed by terms in an item description. The items in database 419 may be indexed by item title and/or another identifier. The items in database 419 may be indexed by terms in a manifest file (e.g., for items that are applications or extensions). The database search engine 418 can use conventional techniques to search for items in the database 419 that are responsive to a query. Database 419 may be distributed across several different computing devices and/or be remote from search server 410.

The search server 410 also includes assisted search interface 412. The assisted search interface 412 may be a layer that sits between the computing system 402 and the database search engine 418. In some implementations, the assisted search interface 412 can be part of the database search engine 418. In some implementations, the assisted search interface 412 can be separate from the database search engine 418. The assisted search interface 412 may be invoked when the user does not provide keywords for searching the database 419. For example, when the user selects content in a webpage and triggers a search via control 130, as illustrated in any of FIGS. 2A-2D. The assisted search interface 412 may take selected content as input. The assisted search interface 412 may take selected content and context for the selected content as input. The assisted search interface 412 may analyze the selected content to identify inferred (most likely) search intents and submit a query or multiple queries to the database search engine 418 for the inferred intent(s). The assisted search interface 412 may provide a search result page as output. The search result page includes responsive items from the database 419. The responsive items are grouped in the search result page by query, as illustrated in any of FIGS. 3A-3C.

The assisted search interface 412 may include a search converter 416 and/or a parallel search module 414. The search converter 416 may analyze the selected content and determine likely search intents represented in the selected content. The search intents are also referred to as objects. The objects represent keywords, phrases, entities, etc., that can be used as a query in the database search engine. The search converter 416 can use machine learning techniques to analyze the input (the selected content). The analysis techniques used by the search converter 416 can depend on the type(s) of content included in the selected content. For example, if the selected content is text, the search converter 416 can pass the text to the database search engine 418 as a query. As another example, if the selected content is text the search converter 416 can parse the text to identify entities mentioned in the text using conventional or later developed natural language processing techniques, to identify an entity to submit as a query. Such techniques can be performed by the search converter 416 and/or by an object identifier 413. The entities mentioned are objects identified in the content.

The natural language processing techniques can provide a confidence that a particular entity is the entity mentioned in the text. For example, the text jaguar can refer to several different entities, e.g., representing a car, an animal, or a football team. The natural language processing techniques can provide a confidence level (score) for each different type of entity. The confidence score represents the likelihood that a particular entity (e.g., the car) is the intended meaning over another entity (e.g., the football team). Context information may improve the confidence levels. The context information may be provided with the selected content and may represent content (e.g., text and/or images) near the selected content in the source webpage. In some implementations, if context information is not provided with the selected content and no entity confidence scores are above a predetermined threshold, the search converter 416 can obtain additional context, e.g., requesting it from the computing system 402. In some implementations where some context is provided but the confidence scores are not above the predetermined threshold the search converter 416 can obtain additional context from the computing system 402. This context can be used in determining the query terms (objects), and in some implementations may only be used if the intent engine has low confidence in the objects recognized.

If the selected content includes image data, the search converter 416 may perform object recognition on the image data using conventional or later developed object recognition techniques. Such techniques can be performed by object identifier 413. The object identifier 413 may use machine-learning techniques to identify objects (entities, keywords, etc.) in the image or images. The object identifier 413 can comprise a machine learning model, a classifier, and/or a regression model. The object identifier 413, or portions of the object identifier 413, may be a service provided by another server or computing device. The object identifier 413 can take text, an image, multiple images, or a combination of text and images, as input and provide objects identified in the input. In some implementations, the object identifier 413 may be part of the search converter 416.

Each object may be provided with a respective confidence score, which represents the likelihood that the object is represented in the input (e.g., the selected content). The object identifier 413 may provide a respective saliency score for each object. The saliency score represents how important/topical the object is for the input. For example, a high saliency score indicates the object is a main topic, main point, or main object in the text or image(s). A lower saliency score indicates the object is tangential or a supporting object. An object with high confidence and high saliency represents a strong inferred search intent. An object with high confidence but low saliency represents a weaker search intent. In some implementations, the object identifier 413 may include multiple different models for analyzing different types of content, e.g., a text or natural language model and an image recognition model. In some implementations, the search converter 416 may determine which model is used in the analysis based on the type of content. In some implementations, where the selected content includes two different types of content, a portion (e.g., a text portion) of the selected content may be provided to one model (or no model) and another portion (e.g., an image portion) of the selected content may be provided to a different model. In some implementations the search converter 416 may use a first model to determine the type(s) of the selected content.

In some implementations, the search converter 416 may convert/translate objects identified in the selected content to keywords (objects) relevant to the items in the database 419. For example, the object identifier 413 may be a service or model that performs object detection, but the objects may not necessarily translate to relevant terms in the database 419, e.g., to searchable item descriptions. The search converter 416 may convert the objects identified to objects more likely to result in identification of an item in the database 419. For example, if the object identifier 413 provides bicycle or skis the search converter may convert the identified object to sports for querying the database 419 where the database 419 relates to games. Similarly, the search converter 416 may convert the objects of beach ball or sand castle to ocean view where the database 419 relates to rental properties or homes for sale. In some implementations, this conversion/translation can be machine-learned. For example, the object identifier 413 may provide candidate objects as input and the search converter 416 may provide the identified objects used in querying the database as output. In this sense, the search converter 416 may be considered an additional, or last layer of an object detection model.

The assisted search interface 412 (e.g., the search converter 416 and/or the parallel search module 414) may rank the identified objects, e.g., the objects provided by the object identifier 413. The rank of an identified object may be based on a combination of the confidence score and the salience score for the object. In some implementations, objects that do not meet a predefined confidence score threshold may not be considered for querying the database 419. In some implementations, objects that do not meet a predefined salience threshold may not be considered for querying the database 419. In some implementations, objects that do not have a combined score that meets a predefined combined threshold may not be considered for querying the database 419. The identified objects that are considered for querying the database 419 are provided to the database search engine 418 as separate queries. In other words, if two objects are considered for querying (e.g., because the objects have confidence and/or salience scores that meet the thresholds), the assisted search interface 412 sends two different queries to the database search engine 418. These queries may be executed in parallel, i.e., executed concurrently, by the database search engine 418. This reduces the delay between triggering the query by the user and presentation of the search result page. If the search converter 416 identifies four objects, four independent queries may be submitted to the database search engine 418.

In some implementations, if no objects are or only one object is considered for querying the database 419 the search converter 416 may provide the object identifier 413 with additional context, and the object identifier 413 may use the additional context to analyze and score the objects identified in the selected content. The additional context may have already been provided to the search converter 416, e.g., with the selected content. The additional context may be obtained from the computing system 402 that triggered the query. In some implementations, the search converter 416 may start with context content that is proximate the selected content in the source webpage (e.g., W1 of FIG. 1), and expand the context as needed to increase the confidence scores. In some implementations, the search converter 416 may provide what context information it has received or can access all at once. In some implementations, a minimum of two (or more) queries may be submitted for the selected content regardless of whether the second object meets the confidence and/or salience thresholds. This may reduce the probability of multiple query submissions.

The assisted search interface 412 may include a parallel search module 414 that manages the queries and the returned results. For example, the parallel search module 414 may submit the queries to the database search engine 418 (or directly to the database 419). The parallel search module 414 may rank the object submitted as queries. The ranking may establish a first, or primary object, a secondary object etc. When search results, in other words items responsive to the query, are returned, the parallel search module 414 may determine which responsive items for the different queries are included in a combined search result page. Put another way, the parallel search module 414 may determine a set of responsive items for each query to return as the combined search result page. The number of items in each set of items may be dependent on a number of factors. For example, the set of items for the primary query (the one with the highest combined confidence and saliency score) may depend on the total number of responsive items returned, the relevance of the items to the query, the difference between the combined score for the primary query and the combined score for the secondary query, and the display area available for the combined search result page. If the combined score of the highest ranked query is much larger than the combined score of the second ranked query, the number of items in the set of responsive items for the highest ranked query may be larger than the number of items in the set of responsive items for the second highest ranked query, if there are enough responsive items to fill out this maximum number. Likewise, if the combined scores of the two highest ranked queries are close, the number of items in the two sets of responsive items may be closer.

The parallel search module 414 may generate the combined search result page by grouping the responsive items in each set of items together. In other words, the responsive items in a set may be kept together in the combined search result page. In some implementations, the responsive items in the first set, e.g., those items responsive to the highest ranked query, may have prominence over the responsive items in the second set, e.g., those items responsive to the second highest ranked query. In some implementations, prominence may be displaying the first set of items ahead of the second set of items. In some implementations, prominence may be including more information for the responsive items in the first set than the responsive items in the second set. In some implementations, individual responsive items in the first set may be presented larger, e.g., take up a larger proportion of the display, than individual responsive items in the second set. In some implementations, prominence may include giving the responsive items in the first set an appearance that differentiates the responsive items in the second set. For example, the responsive items in the first set may be highlighted, have a different color background, have bold text, etc. The parallel search module 414 may provide the combined search result page to the computing system 402 that triggered the query for display, e.g., in a window or tab of the browser 420.

In some implementations, the assisted search interface 412 may send a query or queries to an object provider 470 that is remote from the search server 410. The object provider 470 may be a server that includes a database search engine 476. The database search engine 476 may be similar in function to the database search engine 418. The database search engine may accept a query and search for responsive items in database 479. Database 479 may be similar to database 419 in that the database 479 may not be a database of documents but may index items (make them searchable) based on limited text, such as item descriptions, item titles, item manifests, etc. Thus, implementations are not limited to querying search engines co-located at the search server 410. In addition, in some implementations, the database search engine 418 may be included in (a component of) intent search interface 412. Thus, the configuration illustrated in FIG. 4 is one example and implementations can include variations on the illustrated components.

Figure 5:
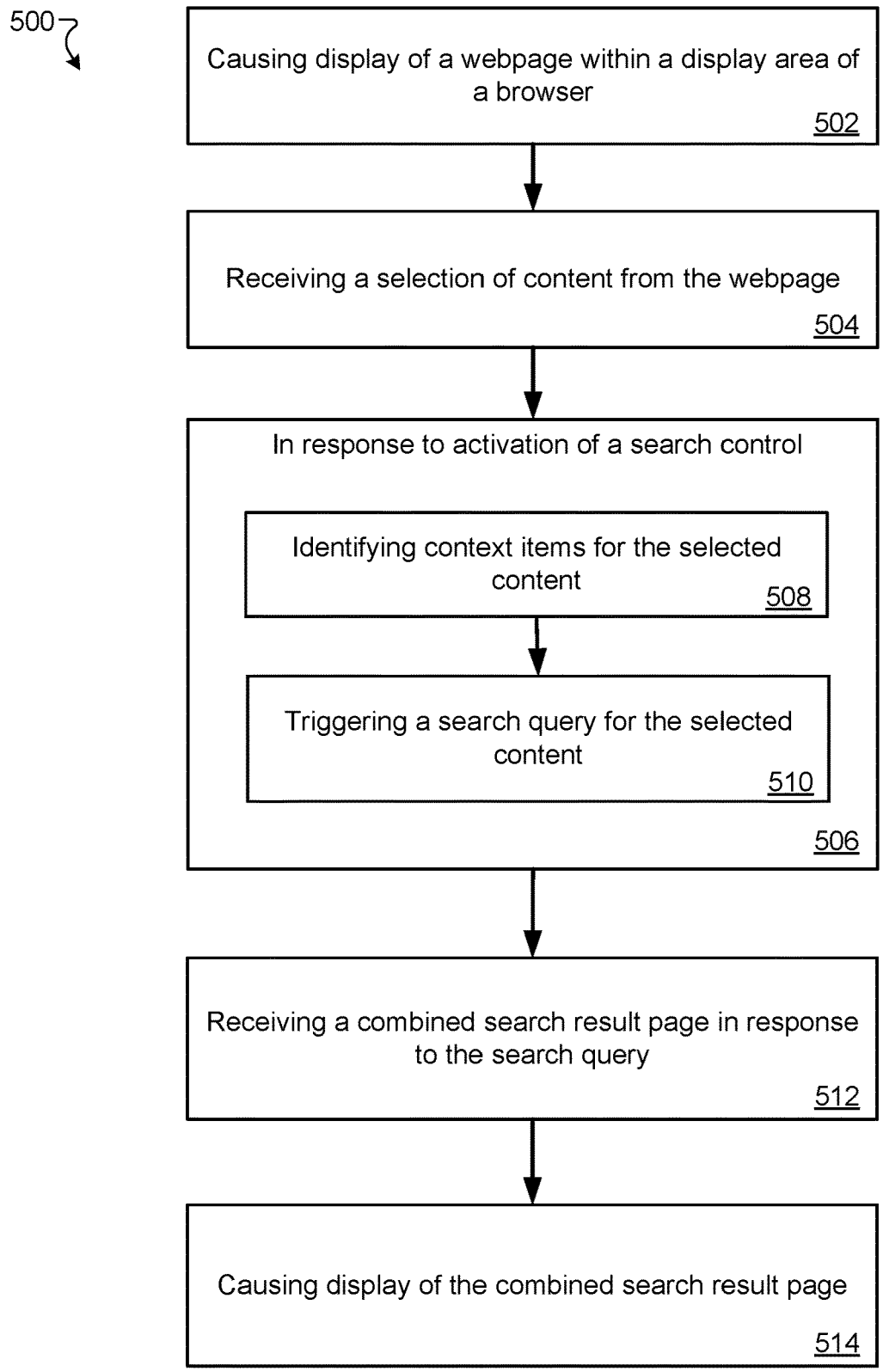
FIG. 5 is a flowchart that illustrates a method of performing at least some of the concepts described herein.

FIG. 5 is a flowchart that illustrates a method 500 that may be performed at a client device according to at least some of the concepts described herein. The method 500 may trigger an assisted search of a database of non-document items and present the results of the search to the user. The method 500 may be performed by a browser, such as browser 420 of FIG. 4 or browser 105 of FIG. 1 or 2A-2D, of a client device. The method 500 may begin with display of a webpage in a display area of the browser (502). The display area may be associated with a tab of the browser. The browser may receive a selection of content (504). The content may be content displayed within the webpage. The selected content can be text based. The selected content can be image based. The selected content can be a combination of text and image data. The selection can be accomplished using conventional techniques. The browser may detect activation of a search control while the content is selected and trigger an assisted search of a database of items (506). The activation of the search control may occur by the user dragging the selected content to the search control and dropping the selected content on the search control. The activation of the search control may occur by the user clicking on/selecting the search control while the content is selected in the webpage.

In some implementations context for the selected content may be identified (508). The context can be text and/or images near (proximate, surrounding), the selected content. The context can be content associated with a document identified in the link address of a link when the link is included in the selected content. The context can include a portion of content on the webpage or include all content on the webpage. The context can include content in certain document objects. The context items can be determined by proximity or another relationship to the selected content. The context items may be provided with the selected content to an assisted search interface. Providing the selected content (and optionally the context items) triggers a search of the database of non-document items (510). In response to triggering the search, the browser receives a combined search result page (512). The combined search result page includes a set of items responsive to a first query (first search results) and a set of items responsive to a second query (second search results) submitted against the database of items. The two sets of items are displayed in groups in the combined search result page. Each responsive item may be actionable, e.g., such that clicking on or tapping on the search result for the responsive item causes the client device to perform an action. The actions may depend on the type of item represented in the database of items. The browser may display the combined search result page (514). This display may be in a new tab of the browser, in a new browser window, or in a split display with the webpage from which the content was selected. Method 500 then ends. Although illustrated with a combined search result page, in some implementations, the search result page may not be a combined search result page but may be a search result page for a single submitted query, e.g., a first set of search results.

Figure 6:
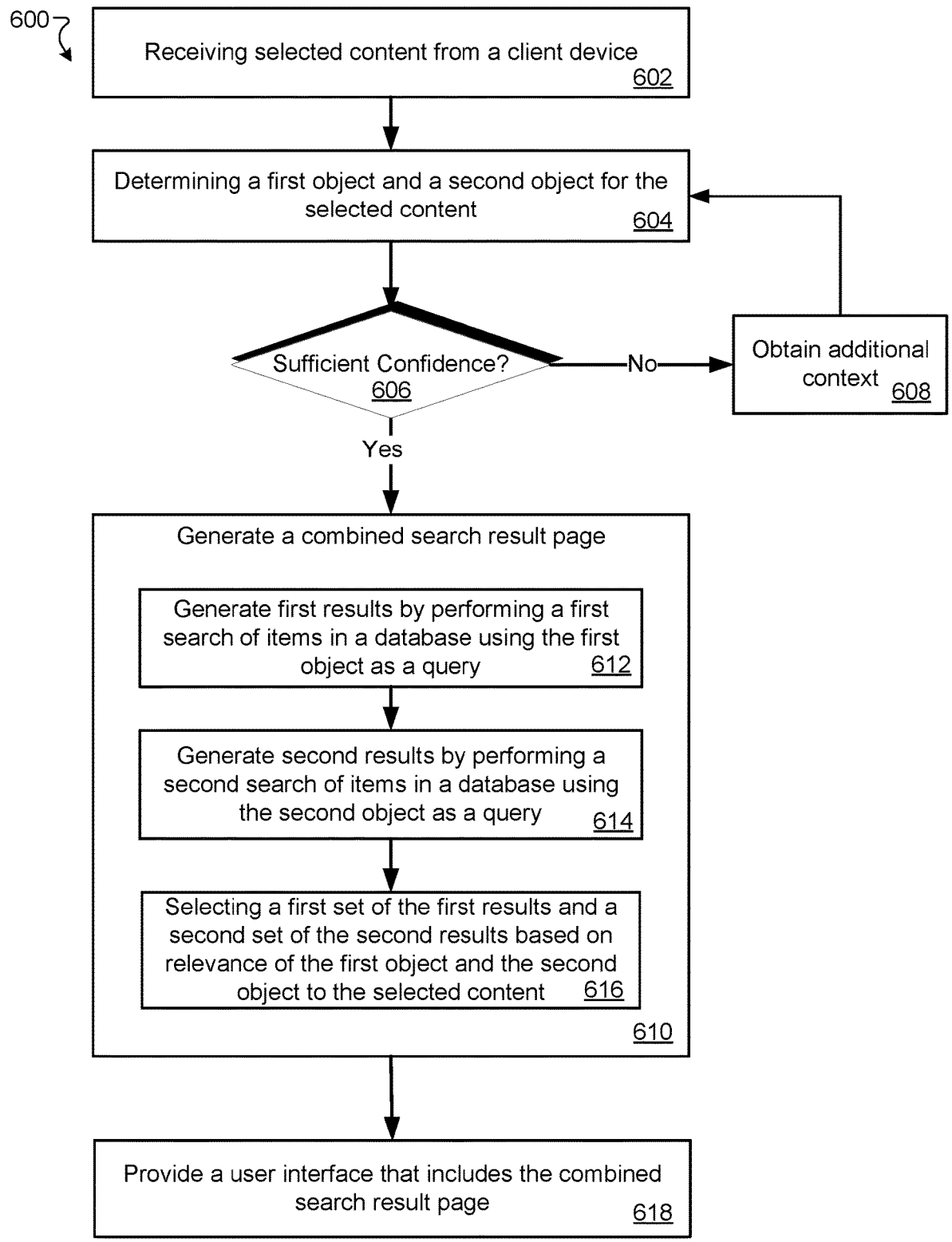
FIG. 6 is a flowchart that illustrates a method of performing at least some of the concepts described herein.

FIG. 6 is a flowchart that illustrates a method 600 performed by a search server according to at least some of the concepts described herein. The method 600 identifies at least one object, interpreted as an inferred search intent, from the selected content for searching a database of discrete items, e.g., items that are not web-based documents and have limited text associated with the item with which to search. Typically, more than one object (inferred query) may be identified from the selected content. The search is conducted using the inferred queries and produces a combined search result page, with items responsive to a particular query being grouped together rather than ranked together and interleaved. The method 600 can be performed by an assisted search interface, such as assisted search interface 412 of FIG. 4.

The method 600 may begin by receiving selected content from a client device (602). In some implementations, the selected content may be received along with context items. The method 600 may include determining a first object and a second object for the selected content (604). In implementations where context is provided with the selected content, the context may be used in determining the first object and the second object. Determining the object may comprise using at least one of: a machine learning model, a classifier, and a regression model. The object detection technique used may depend on the type of the selected content. For example, one technique may be used for selected text while another technique may be used for selected images. If the selected content includes text and images more than one object detection technique may be used. In some implementations, the object detection may use a general detector, e.g., one not customized or specialized for the items in the database. In such implementations, determining the first object and the second object may include converting (translating) the object identified by the general detector (e.g., a candidate object identified using conventional natural language processing, entity detection, etc.) to an object more relevant to the discrete database of items. Some implementations may use a machine learned model customized for the database of items for the conversion. In some implementations, the object detection may already be trained (customized) for the database of items.

The identified objects may each have a respective confidence score. The confidence score indicates a likelihood (probability) that the object is reflected in the selected content. In some implementations the first object and the second object may have a confidence score that meets a predetermined confidence threshold, such as 75% confidence, 80% confidence, 95% confidence, etc. The identified objects may each have a respective salience score. The salience score represents how topical or relevant the object is to the selected content. In some implementations the first object and the second object may have a salience score that meets a predetermined salience threshold, such as 40%, 50%, 55%, etc., where a lower score indicates the object is not likely the subject (not the main idea, concept) of the selected content and a higher score indicates the object is highly relevant to the selected content. For example, objects in the foreground of an image may be considered more salient to the image that objects in the background or partially hidden, etc. In some implementations, if no identified object has a confidence score that meets the confidence threshold (606, No), additional context may be obtained from the webpage (608) and the object detection repeated (604) for the selected content using the additional context, which may help increase the confidence score of one or more of the objects initially detected. In some implementations, context items are not provided with the selected content. In some implementations, context items provided with the selected content represent only a portion of the content of the webpage from which the selected content was taken, so additional context items may be obtained from the webpage. In some implementations, only a portion of the context items provided with the selected content may be used in initially determining the objects and additional context items may be used in a second round of object detection (and potentially a third round with additional context items, if needed).

The method 600 includes generating a combined search result page for queries corresponding to the first object and the second object (610). Generating the combined search result page may include generating first results (a first set of results) by performing a first search of items in a database using the first object as a query (612). Similarly, second results (a second set of results) may be generated by performing a second search of items in the database using the second object as a query (614). The method 600 may include selecting from the first results a first set of the items responsive to the first query for inclusion in the combined search result page (corresponding to a first set of search results) and selecting from the second results a second set of the items responsive to the second query for inclusion in the combined result page (corresponding to a second set of search results) (616). Each search result in the first set of search results corresponds to an item identified as responsive to the first query. Each search result in the second set of search results corresponds to an item identified as responsive to the second query. In some implementations, the first object and the second object (and any other objects submitted as queries) may be ranked, e.g., using the respective confidence scores, the respective salience scores, or a combination of these. In some implementations, the first object may be the highest ranked object. Although not shown in FIG. 6, additional objects may be determined and used in querying the database and generating the combined result. In some implementations, ranking may occur before submitting the query. In some implementations, any objects with a rank that satisfies a threshold may be submitted as a query.

In implementations where the objects are ranked, the first set of results may have more prominence than the second set of results. In one example, prominence may mean that the first set of results may be displayed ahead of the second set of results (e.g., as illustrated in FIG. 3A). In one example, prominence may mean that the individual results in the first set of results may occupy more display area (e.g., be larger than or have more informational items/attributes than) the individual results in the second set of results (e.g., as illustrated in FIG. 3C). In one example, prominence may mean that the first set of results may have a higher number of members (i.e., a higher number of items represented by the search results in the set of results) than the second set of results (e.g., as illustrated in FIG. 3B). The number of items in each set of results, or in other words the number of members in the set of search results that is included in the search result page, can be dependent on a number of factors, including the respective confidence score and/or salience score of the object corresponding to the query, the number of items responsive to the query, the relevance of the responsive items to the query, the display area available for the combined search result page, etc. In some implementations, the number of members (e.g., items represented in) the first set of results (which are included in the search result page) can be a function of a confidence score for the first object, a salience score for the first object, the number of items identified as responsive to the first query, the size of the display, and/or relevance of the first results to the first object. In some implementations, the number of members in the second set of results (which are included in the search result page) can be a function of a confidence score for the second object, a salience score for the second object, the number of items identified as responsive to the second query, the size of the display, and/or relevance of the second results to the second object. In some implementations, the number of members in the second set of results can be influenced by the number of members in the first set of results. In some implementations, the number of members in the second set of results is determined after the number of members in the first set of results is determined. The method 600 may include providing the combined search result page to the client device (618), where it is displayed to the user, e.g., in a user interface of the browser. Method 600 then ends.

Figure 7:
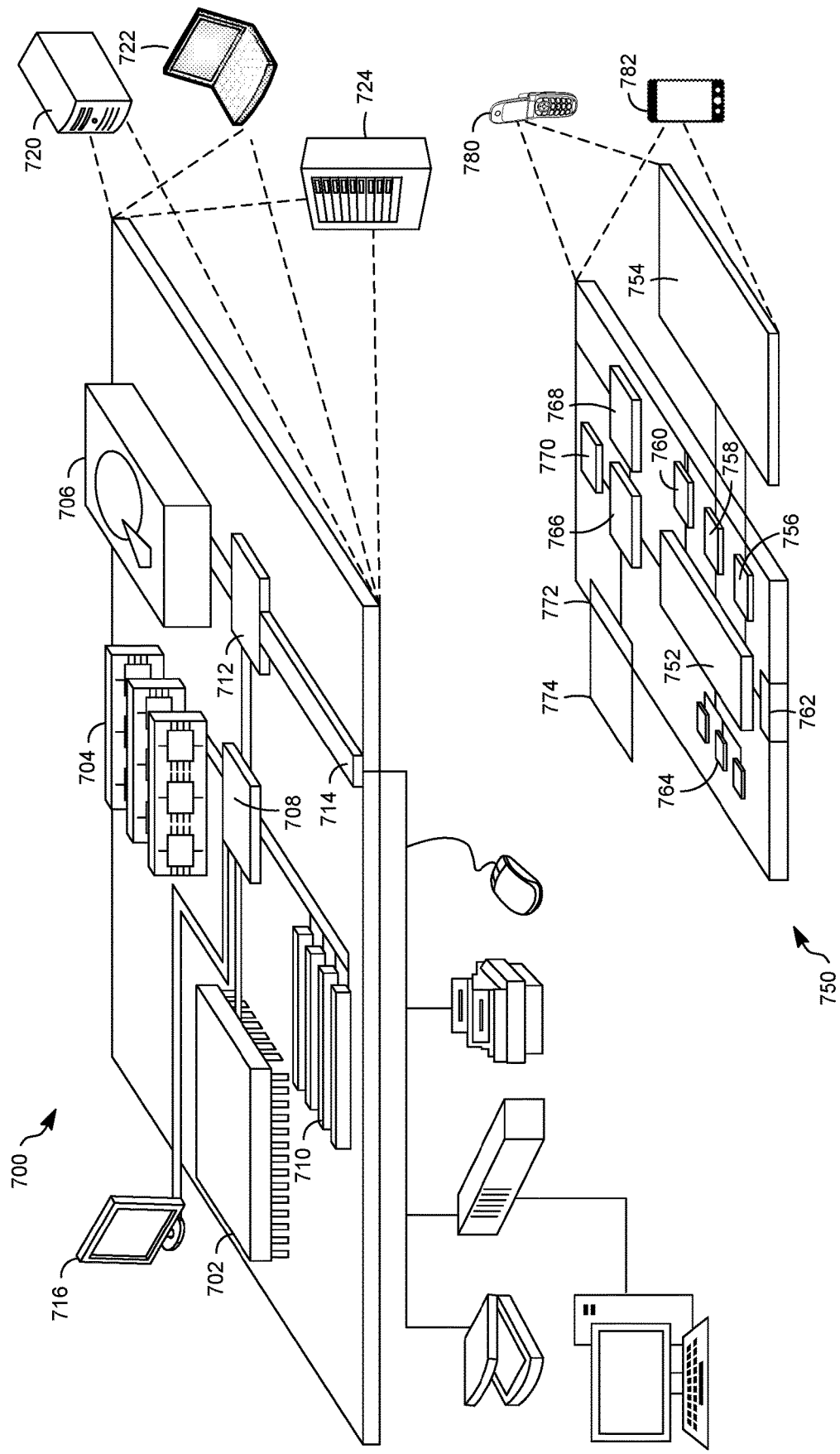
FIG. 7 shows an example of a generic computer device and a generic mobile computer device, which may be used with the techniques described herein.

FIG. 7 shows an example of a generic computer device 700 and a generic mobile computer device 750, which may be used with the techniques described herein. Computing device 700 is intended to represent various forms of digital computers, such as laptops, desktops, tablets, workstations, personal digital assistants, televisions, servers, blade servers, mainframes, and other appropriate computing devices. Computing device 750 is intended to represent various forms of mobile devices, such as personal digital assistants, cellular telephones, smart phones, and other similar computing devices. The components shown here, their connections and relationships, and their functions, are meant to be examples only, and are not meant to limit implementations of the inventions described and/or claimed in this document.

Computing device 700 includes a processor 702, memory 704, a storage device 706, a high-speed interface 708 connecting to memory 704 and high-speed expansion ports 710, and a low speed interface 712 connecting to low speed bus 714 and storage device 706. The processor 702 can be a semiconductor-based processor. The memory 704 can be a semiconductor-based memory. Each of the components 702, 704, 706, 708, 710, and 712, are interconnected using various busses, and may be mounted on a common motherboard or in other manners as appropriate. The processor 702 can process instructions for execution within the computing device 700, including instructions stored in the memory 704 or on the storage device 706 to display graphical information for a GUI on an external input/output device, such as display 716 coupled to high speed interface 708. In other implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system).

The memory 704 stores information within the computing device 700. In one implementation, the memory 704 is a volatile memory unit or units. In another implementation, the memory 704 is a non-volatile memory unit or units. The memory 704 may also be another form of computer-readable medium, such as a magnetic or optical disk.

The storage device 706 is capable of providing mass storage for the computing device 700. In one implementation, the storage device 706 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 704, the storage device 706, or memory on processor 702.

The high speed controller 708 manages bandwidth-intensive operations for the computing device 700, while the low speed controller 712 manages lower bandwidth-intensive operations. Such allocation of functions is exemplary only. In one implementation, the high-speed controller 708 is coupled to memory 704, display 716 (e.g., through a graphics processor or accelerator), and to high-speed expansion ports 710, which may accept various expansion cards (not shown). In the implementation, low-speed controller 712 is coupled to storage device 706 and low-speed expansion port 714. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 720, or multiple times in a group of such servers. It may also be implemented as part of a rack server system 724. In addition, it may be implemented in a personal computer such as a laptop computer 722. Alternatively, components from computing device 700 may be combined with other components in a mobile device (not shown), such as device 750. Each of such devices may contain one or more of computing devices 700, 750, and an entire system may be made up of multiple computing devices 700, 750 communicating with each other.

Computing device 750 includes a processor 752, memory 764, an input/output device such as a display 754, a communication interface 766, and a transceiver 768, among other components. The device 750 may also be provided with a storage device, such as a microdrive or other device, to provide additional storage. Each of the components 750, 752, 764, 754, 766, and 768, are interconnected using various buses, and several of the components may be mounted on a common motherboard or in other manners as appropriate.

The processor 752 can execute instructions within the computing device 750, including instructions stored in the memory 764. The processor may be implemented as a chipset of chips that include separate and multiple analog and digital processors. The processor may provide, for example, for coordination of the other components of the device 750, such as control of user interfaces, applications run by device 750, and wireless communication by device 750.

Processor 752 may communicate with a user through control interface 758 and display interface 756 coupled to a display 754. The display 754 may be, for example, a TFT LCD (Thin-Film-Transistor Liquid Crystal Display) or an OLED (Organic Light Emitting Diode) display, or other appropriate display technology. The display interface 756 may comprise appropriate circuitry for driving the display 754 to present graphical and other information to a user. The control interface 758 may receive commands from a user and convert them for submission to the processor 752. In addition, an external interface 762 may be provided in communication with processor 752, so as to enable near area communication of device 750 with other devices. External interface 762 may provide, for example, for wired communication in some implementations, or for wireless communication in other implementations, and multiple interfaces may also be used.

The memory 764 stores information within the computing device 750. The memory 764 can be implemented as one or more of a computer-readable medium or media, a volatile memory unit or units, or a non-volatile memory unit or units. Expansion memory 774 may also be provided and connected to device 750 through expansion interface 772, which may include, for example, a SIMM (Single In Line Memory Module) card interface. Such expansion memory 774 may provide extra storage space for device 750, or may also store applications or other information for device 750. Specifically, expansion memory 774 may include instructions to carry out or supplement the processes described above, and may include secure information also. Thus, for example, expansion memory 774 may be provided as a security module for device 750, and may be programmed with instructions that permit secure use of device 750. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 764, expansion memory 774, or memory on processor 752, that may be received, for example, over transceiver 768 or external interface 762.

Device 750 may communicate wirelessly through communication interface 766, which may include digital signal processing circuitry where necessary. Communication interface 766 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through transceiver 768. In addition, short-range communication may occur, such as using a Bluetooth, WiFi, or other such transceiver (not shown). In addition, GPS (Global Positioning System) receiver module 770 may provide additional navigation- and location-related wireless data to device 750, which may be used as appropriate by applications running on device 750.

Device 750 may also communicate audibly using audio codec 760, which may receive spoken information from a user and convert it to usable digital information. Audio codec 760 may likewise generate audible sound for a user, such as through a speaker, e.g., in a handset of device 750. Such sound may include sound from voice telephone calls, may include recorded sound (e.g., voice messages, music files, etc.) and may also include sound generated by applications operating on device 750.

The computing device 750 may be implemented in a number of different forms, as shown in the figure. For example, it may be implemented as a cellular telephone 780. It may also be implemented as part of a smart phone 782, personal digital assistant, or other similar mobile device.

Various implementations of the systems and techniques described herein can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described herein can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described herein can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described herein), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of implementations have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems.

According to one aspect, a computer-implemented method includes receiving selected content from a client device, determining at least a first object and a second object for the selected content using a search converter, generate first results by performing a first search of items in a database using the first object as a query, and generate second results by performing a second search of the items in the database using the second object as a query. The method may further include selecting a first set of the first results based on relevance of the first object to the selected content and a second set of the second results based on relevance of the second object to the selected content and providing, for display, a user interface that includes the first set of the first results and the second set of the second results.

These and other aspects can include one or more of the following features, alone or in combination. For example, the first results in the first set may have prominence over the second results in the second set. Prominence can be manifested as the first results in the first set having more information than the second results in the second set, the first set occupying more space on the display than the second set, and/or the first results in the first set being displayed ahead of the second results in the second set. As another example, the search converter can include an object detection model with a layer that converts objects identified in the selected content to keywords relevant to items in the database. As another example, the first set may have a first number of members and the first results may have a second number of results and the first number of members can be a function of at least two of a confidence score for the first object, a salience score for the first object, the second number of results, a size of the display, or relevance of the first results to the first object. As another example, the query for the first object and the query for the second object can be submitted in parallel. As another example, the first set can have prominence over the second set due to a score calculated by the search converter for the first object being higher than a score calculated by the search converter for the second object. The score can be a combination of a confidence score and a saliency score. As another example, the search converter can use at least one of: a machine-learned model, a classifier, or a regression model. As another example, the search converter can include a first model that classifies a type of the selected content and the type of the selected content is used to determine a second model for analyzing the selected content. As another example, the method may also include receiving context for the selected content, the context including other content displayed with the selected content, wherein the context is used by the search converter in determining the first object and the second object. As another example, the database can include at least one of searchable item descriptions, searchable item titles, or searchable manifest files. As another example, the first results and the second results are generated due to a first score calculated by the search converter for the first object and a second score.

According to one aspect, a system can comprise at least one processor and memory storing instructions that, when executed by the at least one processor, cause the system to perform any of the methods or operations disclosed herein.

According to one aspect, a system can comprise a non-transitory computer-readable medium storing instructions that, when executed by a processor, cause a computing system to perform any of the methods or operations disclosed herein.

What is claimed is:

1. A computer-implemented method comprising:
   receiving selected content from a client device;
   determining at least a first object and a second object for the selected content using a search converter, wherein the search converter includes an object detection model with a layer that converts objects identified in the selected content to keywords for searching items in a database;
   generate first results by performing a first search of items in the database using the first object as a query;
   generate second results by performing a second search of the items in the database using the second object as a query;
   selecting a first set of the first results based on relevance of the first object to the selected content and a second set of the second results based on relevance of the second object to the selected content; and
   providing, for display, a user interface that includes the first set of the first results and the second set of the second results.

2. The computer-implemented method of claim 1, wherein the first results in the first set have prominence over the second results in the second set.

3. The computer-implemented method of claim 2, wherein the prominence is manifested as the first results in the first set having more information than the second results in the second set.

4. The computer-implemented method of claim 2, wherein the prominence is manifested as the first set occupying more space on the display than the second set.

5. The computer-implemented method of claim 2, wherein the prominence is manifested as the first results in the first set being displayed ahead of the second results in the second set.

6. The computer-implemented method of claim 1, wherein the first set has a first number of members and the first results has a second number of results and the first number of members is a function of at least two of a confidence score for the first object, a salience score for the first object, the second number of results, a size of the display, or relevance of the first results to the first object.

7. The computer-implemented method of claim 1, wherein the query for the first object and the query for the second object are submitted in parallel.

8. The computer-implemented method of claim 1, wherein the first set has prominence over the second set due to a score calculated by the search converter for the first object being higher than a score calculated by the search converter for the second object.

9. The computer-implemented method of claim 8, wherein the score is a combination of a confidence score and a saliency score.

10. The computer-implemented method of claim 1, wherein the search converter uses at least one of: a machine-learned model, a classifier, or a regression model.

11. The computer-implemented method of claim 1, wherein the search converter includes a first model that classifies a type of the selected content and the type of the selected content is used to determine a second model for analyzing the selected content.

12. The computer-implemented method of claim 1, further comprising:
    receiving context for the selected content, the context including other content displayed with the selected content,
    wherein the context is used by the search converter in determining the first object and the second object.

13. The computer-implemented method of claim 1, wherein the database includes at least one of searchable item descriptions, searchable item titles, or searchable manifest files.

14. A system comprising:
    at least one processor; and
    memory storing instructions that, when executed by the at least one processor, cause the system to perform operations including:
    receiving selected content from a client device,
    determining at least a first object and a second object by analyzing the selected content using a search converter, wherein the search converter includes an object detection model with a layer that converts objects identified in the selected content to keywords for searching for objects items in a database,
    generate first results by performing a first search of items in the database using the first object as a query,
    generate second results by performing a second search of the items in the database using the second object as a query,
    selecting a first set of the first results based on relevance of the first object to the selected content and a second set of the second results based on relevance of the second object to the selected content, and
    providing, for display, a user interface that includes the first set of the first results and the second set of the second results.

15. The system of claim 14, wherein the database includes at least one of searchable item descriptions, searchable item titles, or searchable manifest files.

16. The system of claim 14, wherein the first set has prominence over the second set due to a score calculated by the search converter for the first object being higher than a score calculated by the search converter for the second object.

17. The system of claim 16, wherein the score is a combination of a confidence score and a saliency score.

18. The system of claim 14, wherein the first results and the second results are generated due to a first score calculated by the search converter for the first object and a second score calculated by the search converter for the second object meeting a threshold, the first score and the second score reflecting confidence and saliency.

19. A non-transitory computer-readable medium storing instructions that, when executed by a processor of a computing device, cause the computing device to perform operations comprising:
    receiving selected content from a client device, the selected content being content of a webpage;
    determining at least a first object and a second object for the selected content using a search converter, wherein the search converter includes an object detection model with a layer that converts objects identified in the selected content to keywords for searching for objects items in a database;

generate first results by performing a first search of items in the database using the first object as a query;

generate second results by performing a second search of the items in the database using the second object as a query;

selecting a first set of the first results based on relevance of the first object to the selected content and a second set of the second results based on relevance of the second object to the selected content; and providing, for display, a user interface that includes the first set of the first results and the second set of the second results.

20. The non-transitory computer-readable medium of claim 19, wherein the first set has prominence over the second set due to a score calculated by the search converter for the first object being higher than a score calculated by the search converter for the second object, wherein the score is a combination of a confidence score and a saliency score.

\* \* \* \* \*